United States Patent [19]
Taylor et al.

[11] Patent Number: 5,793,264
[45] Date of Patent: Aug. 11, 1998

[54] LAN EQUALIZER

[75] Inventors: Craig M. Taylor, Shaw; Nicholas Mihailovits, Sale, both of United Kingdom

[73] Assignee: Plessey Semiconductor Limited, United Kingdom

[21] Appl. No.: 733,239

[22] Filed: Oct. 2, 1996

[30] Foreign Application Priority Data

Oct. 6, 1995 [GB] United Kingdom ............ 9520468

[51] Int. Cl.⁶ ........................................ H03H 7/03
[52] U.S. Cl. ................ 333/28 R; 330/126; 330/304
[58] Field of Search ................. 333/28 R; 330/126, 330/304; 375/229

[56] References Cited

U.S. PATENT DOCUMENTS

| | | | |
|---|---|---|---|
| 3,517,223 | 6/1970 | Gaunt, Jr. ............... | 333/28 R X |
| 3,794,935 | 2/1974 | Tsuchiya et al. ............. | 333/28 R |
| 3,902,131 | 8/1975 | Dorren ........................... | 330/126 |
| 4,071,782 | 1/1978 | Vidovic ........................... | 333/28 R X |
| 4,273,963 | 6/1981 | Seidel . | |
| 4,354,160 | 10/1982 | Pierce ........................... | 330/107 |
| 4,996,497 | 2/1991 | Waehner ....................... | 330/151 |
| 4,999,522 | 3/1991 | Deville .......................... | 307/520 |
| 5,280,346 | 1/1994 | Ross ............................. | 333/28 R X |
| 5,442,328 | 8/1995 | Halin ............................ | 333/18 |

FOREIGN PATENT DOCUMENTS 0 413 934 A2  2/1991  European Pat. Off. .
2 098 423  11/1982  United Kingdom .

Primary Examiner—Paul Gensler
Attorney, Agent, or Firm—Kirschstein, et al.

[57] ABSTRACT

An equaliser circuit arrangement for compensating for the frequency-dependent characteristics of a transmission line such as an untwisted pair, for lines of lengths up to, say, 125 meters and at data rates up to, say, 155MBits/sec., in which signals from the transmission line are applied by way of a unity gain path and a frequency-selective path including a first wide-band amplifier of variable gain to a summing node. The signals at the summing node may be further amplified by a second wide-band variable gain amplifier using gain control signals derived for the first amplifier.

4 Claims, 4 Drawing Sheets

LAN EQUALIZER

SUMMARY OF THE INVENTION

The present invention relates to an equaliser circuit which may be implemented in a single monolithic circuit, for use for example with untwisted pair cables.

The circuit provides both amplitude and phase equalization in a continuously variable manner for any cable length from 0 to 125 meters at data transfer rates up to 155MBits/sec. The circuit is implemented in monolithic form without the need for external components.

According to the invention, therefore, an equaliser circuit arrangement for use with variable lengths of transmission line comprises a fixed gain substantially non frequency-selective path, a frequency-selective path having variable gain, means to apply signals received over a length of transmission line to the inputs of both said paths and means to sum the outputs of said paths.

Preferably said fixed gain path is a unity gain path, and said frequency selective path comprises a passive frequency-selective circuit and a wide band variable gain amplifier. The means to apply signals to the inputs of said paths may comprise two pairs of emitter follower stages.

The frequency-selective path may comprise a high-pass section, the bottom plates of all the capacitors in this high-pass section being connected to the respective emitters of the pair of emitter follower stages by which signals are applied to the frequency-selective path.

BRIEF DESCRIPTION OF THE DRAWINGS

An equaliser circuit arrangement in accordance with the present invention will now be described with reference to the accompanying drawings, of which.

DETAILED DESCRIPTION OF THE PREFERRED EMBODIMENTS

Figure 1:
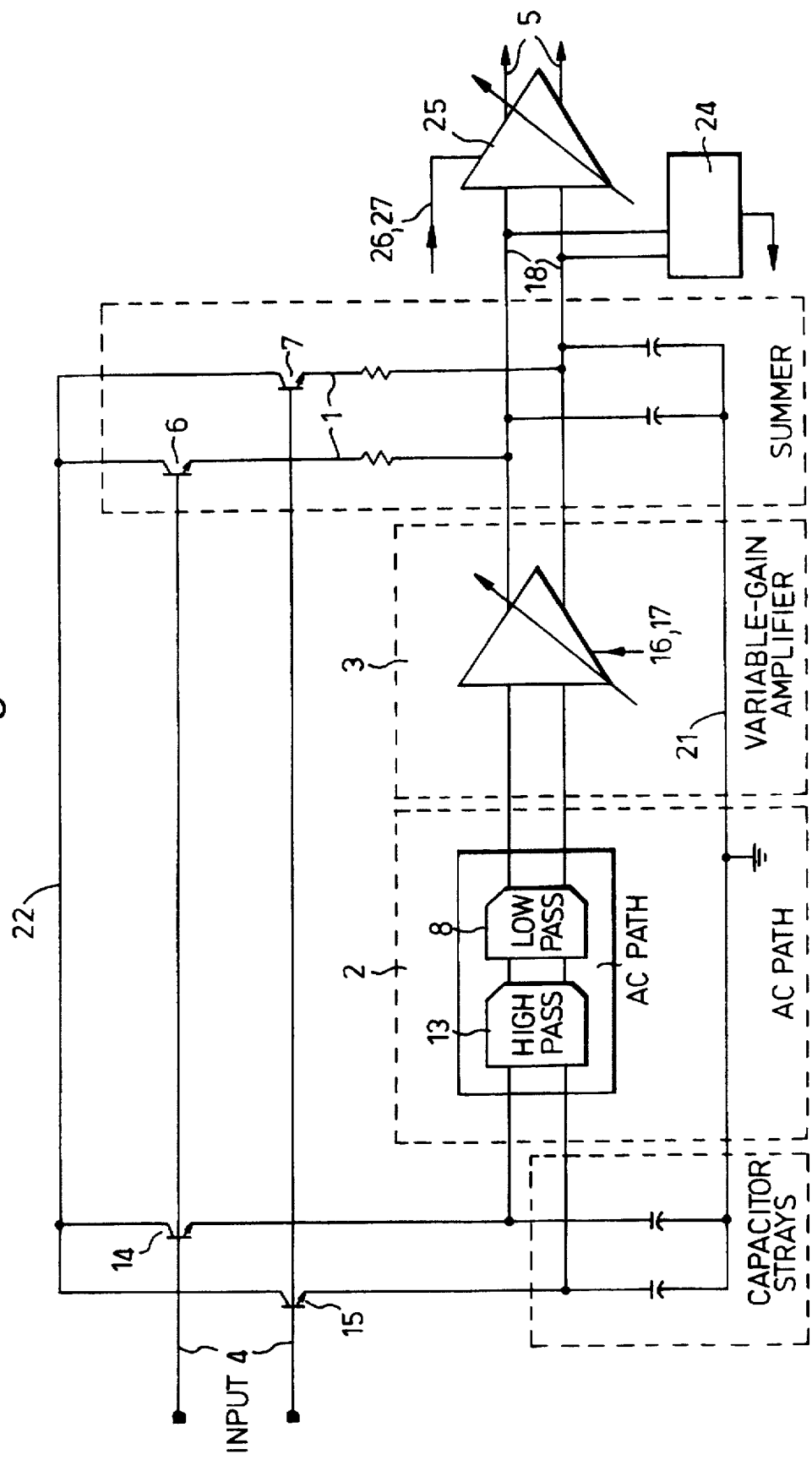
FIG. 1 shows the circuit arrangement schematically.

Referring first to FIG. 1, the circuit arrangement comprises a fixed gain signal path 1, a frequency selective AC signal path 2 and a variable gain amplifier 3. The AC path is used to compensate for amplitude and phase distortions caused by the restricted bandwidth of a communication cable connected to input terminals 4 and so restore the received pulse shape prior to slicing. Adjustment of the gain of the amplifier 3 is the means by which the level of equalization is matched to the cable length used. Signals from the fixed gain path 1 and the AC path 2, 3 are summed and applied to output terminals 5. The overall pole/zero transfer function is third order.

Several circuit features contribute to accurate equalization over the range of application stated. These are:
1. The architecture utilises only a single wide-band variable gain amplifier 3.
2. The unity gain signal path is provided by simple emitter follower circuits 6 and 7, which give minimum contribution to wide-band noise whilst providing a flat amplitude characteristic combined with linear phase over the frequency range of interest (DC to at least 200 MHz).
3. The AC path 2 is realized with simple passive component combinations (capacitors and resistors).
4. The AC path 2 incorporates a final first-order low-pass filter 8 which restricts the noise bandwidth in this part of the circuit.
5. The architecture enables the signals from the two paths to be summed without the amplitude and phase effects from the poles and zeros associated with unavoidable circuit parasitics distorting the target response. The dominant contributors in terms of disruption of the equalizer characteristic are the bottom plate strays of the chip capacitors in the high pass sections of the AC path 2 and the poles associated with the variable gain amplifier 3.

Figure 2A:
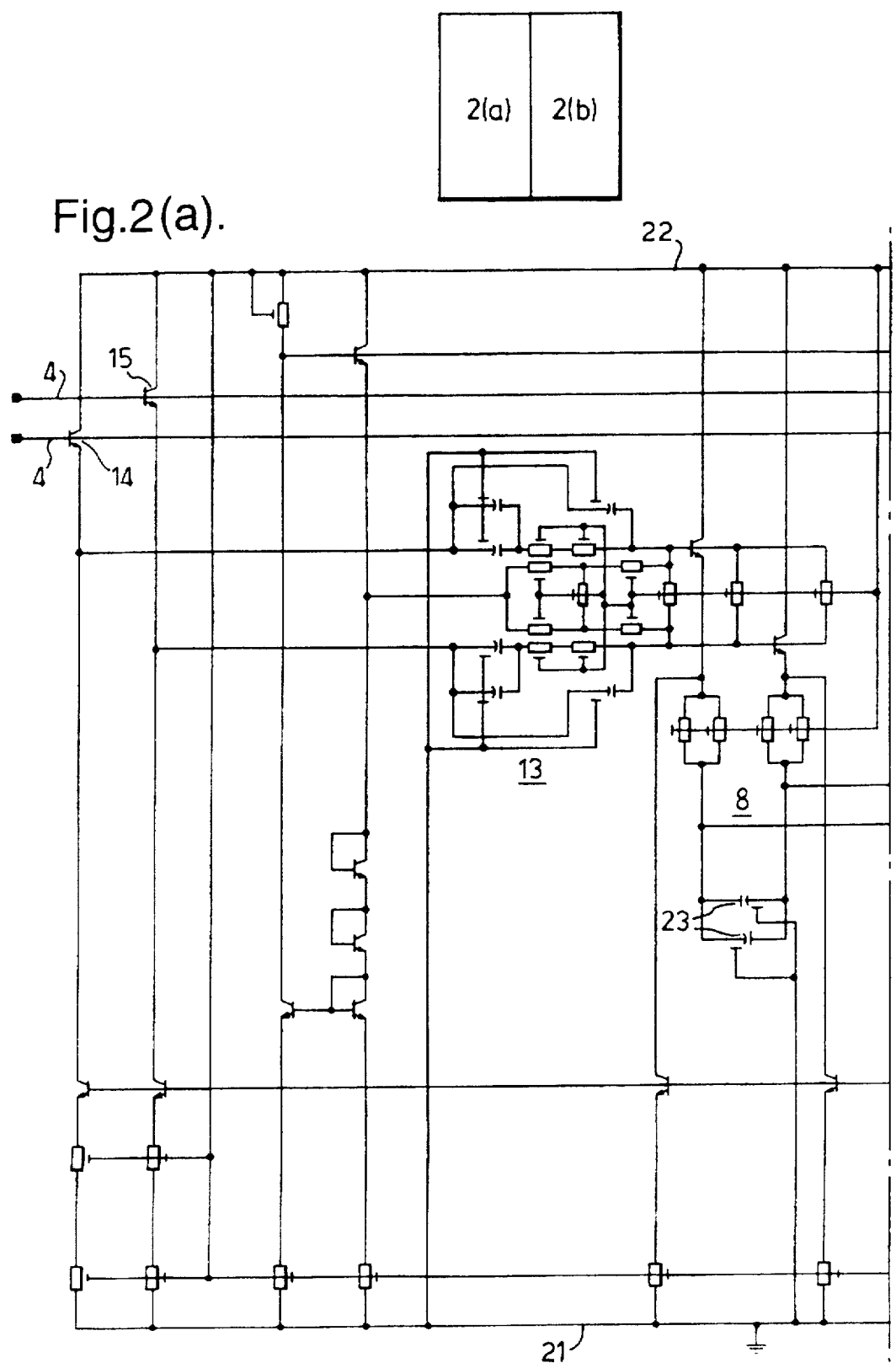
FIGS. 2(a) and 2(b) show the full circuit arrangement diagrammatically.
Figure 2B:
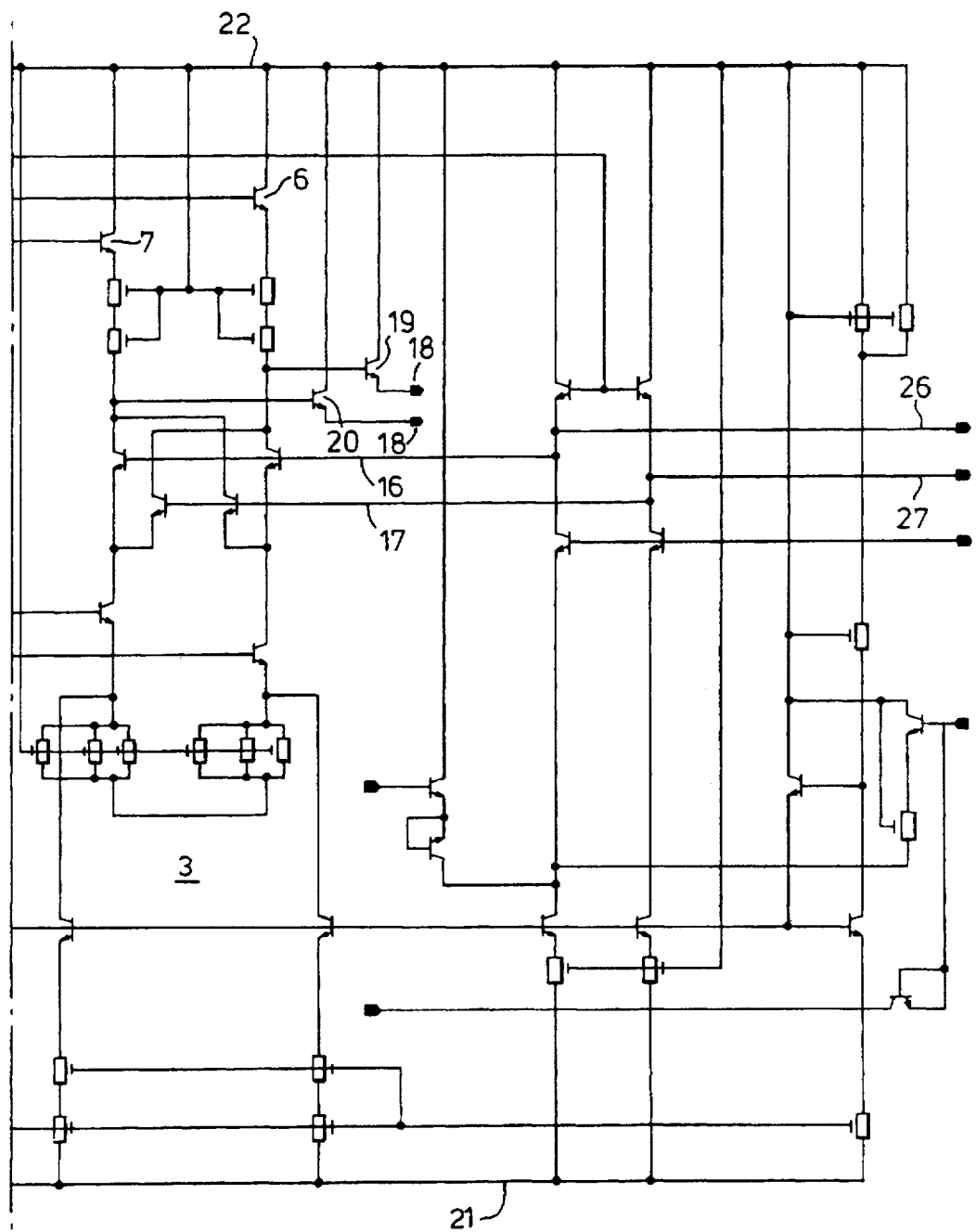
Figure 3:
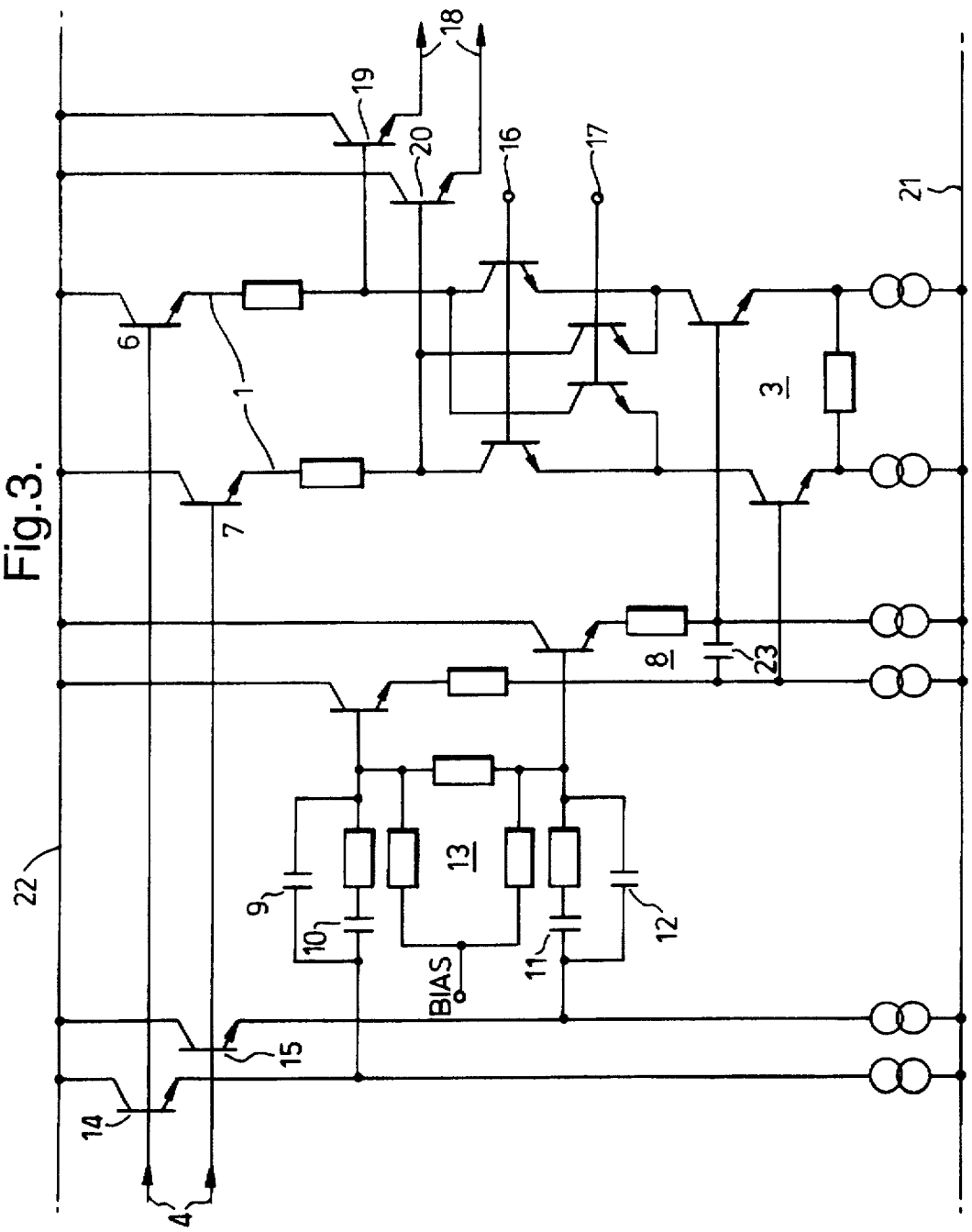
FIG. 3 shows part of the circuit arrangement of FIGS. 2(a) and 2(b) in simplified form.

Referring now to FIGS. 2(a), 2(b) and 3, the circuit architecture used allows the bottom plates of all the capacitors 9–12 in the high pass section 13 to be connected to the input side of the equalizer which is driven by low output impedance emitter-follower circuits 14 and 15. By this means these strays are made to have negligible impact on performance. In addition, the amplifier 3 and summer are effectively combined so that the amplifier dominant pole is common to both signal paths thus impacting on the frequency characteristics of each in the same way. The amplitude and phase characteristics of the two paths thus remain correctly matched.

Referring particularly to FIG. 3, the variable gain amplifier 3 takes the form of a variable transconductance multiplier, the gain being varied by means of control voltages applied to conductors 16 and 17 and the summed signals from the two paths being applied to the output 18 of the circuit arrangement by way of emitter follower stages 19 and 20.

As indicated diagrammatically in FIGS. 2(a) and 2(b), in the integrated circuit realisation the isolation for all the capacitors in the circuit arrangement is connected to the negative supply line 21 while the isolation for all the resistors is connected to the positive supply line 22. The capacitive element 23 of the low pass section 8 comprises two capacitors connected in parallel in opposite senses to minimise the effect of strays.

The gain control voltages for the amplifier 3, as shown in FIG. 1, may be derived by means of peak detector 24 from the signal at the output 18 of the circuit arrangement, and these gain control voltages may be applied to control the gain of a following variable gain amplifier stage 25, by way of conductors 26 and 27, such that the output signal is amplified to a required level.

We claim:

1. An equalizer circuit arrangement for use with variable lengths of transmission line, comprising:

a fixed gain, substantially non frequency-selective path having an input and an output;

a frequency-selective path having an input, an output, and a variable gain;

means including at least one pair of emitter follower stages, to apply signals received over a length of transmission line to said inputs of said paths;

said frequency-selective path including a high-pass section having a plurality of capacitors, all said capacitors in said high-pass section having bottom plates connected to respective emitters of said at least one pair of emitter follower stages; and means to sum said outputs of said paths.

2. An equalizer circuit arrangement for use with variable lengths of transmission line, comprising:

a unity gain, substantially non frequency-selective path having an input and an output;

a frequency-selective path including an input, an output, a passive frequency-selective circuit, and a wide-band variable gain amplifier;

means including at least one pair of emitter follower stages, to apply signals received over a length of transmission line to said inputs of said paths;

said passive frequency-selective circuit including a high-pass section having a plurality of capacitors, all said capacitors in said high-pass section having bottom plates connected to respective emitters of said at least one pair of emitter follower stages; and means to sum said outputs of said paths.

3. The equalizer circuit arrangement in accordance with claim 2, wherein said means to sum said outputs has a signal output at which appear output signals having an amplitude, and means to derive a gain control voltage for said variable gain amplifier from said amplitude of said output signals.

4. The equalizer circuit arrangement in accordance with claim 3, and a second variable gain amplifier to which said output signals are applied, and means to apply said gain control voltage to said second variable gain amplifier to effect a required output signal level.

* * * * *